United States Patent
Shedden

(10) Patent No.: US 10,308,292 B1
(45) Date of Patent: Jun. 4, 2019

(54) TRUCK TAILGATE TABLE

(71) Applicant: William Shedden, Rogersville, TN (US)

(72) Inventor: William Shedden, Rogersville, TN (US)

(*) Notice: Subject to any disclaimer, the term of this patent is extended or adjusted under 35 U.S.C. 154(b) by 0 days.

(21) Appl. No.: 15/838,507

(22) Filed: Dec. 12, 2017

(51) Int. Cl.
*B62D 33/027* (2006.01)
*B62D 33/03* (2006.01)

(52) U.S. Cl.
CPC ......... *B62D 33/0273* (2013.01); *B62D 33/03* (2013.01)

(58) Field of Classification Search
CPC .. B62D 33/0273; B62D 33/027; B62D 33/03; B60J 5/108
USPC ................ 296/26.09, 50, 51, 57.1
See application file for complete search history.

(56) References Cited

U.S. PATENT DOCUMENTS

| | | | |
|---|---|---|---|
| 5,649,734 A | 7/1997 | Spels | |
| 5,803,523 A * | 9/1998 | Clark | B60P 1/435 14/71.1 |
| 5,816,637 A | 10/1998 | Adams | |
| 5,823,595 A | 10/1998 | Tronco | |
| 6,045,172 A | 4/2000 | Thomas | |
| 6,161,486 A * | 12/2000 | Boots | A47B 5/06 108/33 |
| 6,193,294 B1 | 2/2001 | Disner | |
| 6,364,391 B1 * | 4/2002 | Everett | B60N 2/24 296/51 |
| D475,678 S | 6/2003 | Evans | |
| 6,641,190 B2 | 11/2003 | Kirchhoff | |
| 6,957,840 B1 * | 10/2005 | Endres | B62D 33/0273 296/26.08 |
| 6,991,277 B1 * | 1/2006 | Esler | B60P 1/435 296/26.08 |
| D527,697 S | 9/2006 | Metros | |
| 7,628,439 B1 * | 12/2009 | Strong | B62D 33/0273 108/44 |
| 8,511,734 B2 * | 8/2013 | Hutchins, Jr. | B60P 1/435 296/61 |
| 9,549,610 B1 * | 1/2017 | Gettel | B60R 9/00 |
| 9,926,018 B2 * | 3/2018 | Spahn | B62D 33/0273 |
| 10,106,208 B2 * | 10/2018 | Barrios Albert | B62D 33/03 |
| 10,117,509 B1 * | 11/2018 | Cooke | A47B 3/0912 |
| 10,160,364 B2 * | 12/2018 | Howe | A47B 3/08 |
| 2002/0180231 A1 * | 12/2002 | Fox | B60P 3/40 296/26.01 |

(Continued)

FOREIGN PATENT DOCUMENTS

WO     2013151815 A     10/2013

*Primary Examiner* — Gregory A Blankenship
(74) *Attorney, Agent, or Firm* — Kyle A. Fletcher, Esq.

(57) ABSTRACT

The truck tailgate table comprises a tailgate and an extendable table. The extendable table is stored within a hollow cavity inside of the tailgate when the extendable table is not in use. To deploy the extendable table, the tailgate is lowered to a horizontal position and a tailgate cap is opened. A tabletop is pulled from within the tailgate and moves over front and rear rollers within the tailgate. The rollers act as stops to prevent the tabletop from being pulled completely out of the tailgate. A left telescopic leg and a right telescopic leg are pivoted from horizontal positions beneath the tabletop to vertical positions at the rear corners of the tabletop. The length of each leg may be adjusted so that the leg touches the ground when the tabletop is horizontal.

15 Claims, 4 Drawing Sheets

(56) References Cited

U.S. PATENT DOCUMENTS

2007/0237614 A1* 10/2007 Johnson ................. B60P 1/431
                                                    414/467
2018/0009487 A1*  1/2018 Astrike .................... B60P 7/02
2018/0056842 A1*  3/2018 Miranda Nieto ....... B60P 1/435

* cited by examiner

TRUCK TAILGATE TABLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of recreational equipment, more specifically, a truck tailgate table.

SUMMARY OF INVENTION

The truck tailgate table comprises a tailgate and an extendable table. The extendable table is stored within a hollow cavity inside of the tailgate when the extendable table is not in use. To deploy the extendable table, the tailgate is lowered to a horizontal position and a tailgate cap is opened. A tabletop is pulled from within the tailgate and moves over front and rear rollers within the tailgate. The rollers act as stops to prevent the tabletop from being pulled completely out of the tailgate. A left telescopic leg and a right telescopic leg are pivoted from horizontal positions beneath the tabletop to vertical positions at the rear corners of the tabletop. The length of each leg may be adjusted so that the leg touches the ground when the tabletop is horizontal.

An object of the invention is to provide a table for use during outdoor events near a pickup truck.

Another object of the invention is to store the table within the tailgate of the pickup truck.

A further object of the invention is to provide legs that fold up and are also stored within the tailgate.

Yet another object of the invention is to provide length adjustment for the legs.

These together with additional objects, features and advantages of the truck tailgate table will be readily apparent to those of ordinary skill in the art upon reading the following detailed description of the presently preferred, but nonetheless illustrative, embodiments when taken in conjunction with the accompanying drawings.

In this respect, before explaining the current embodiments of the truck tailgate table in detail, it is to be understood that the truck tailgate table is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the truck tailgate table.

It is therefore important that the claims be regarded as including such equivalent construction insofar as they do not depart from the spirit and scope of the truck tailgate table. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
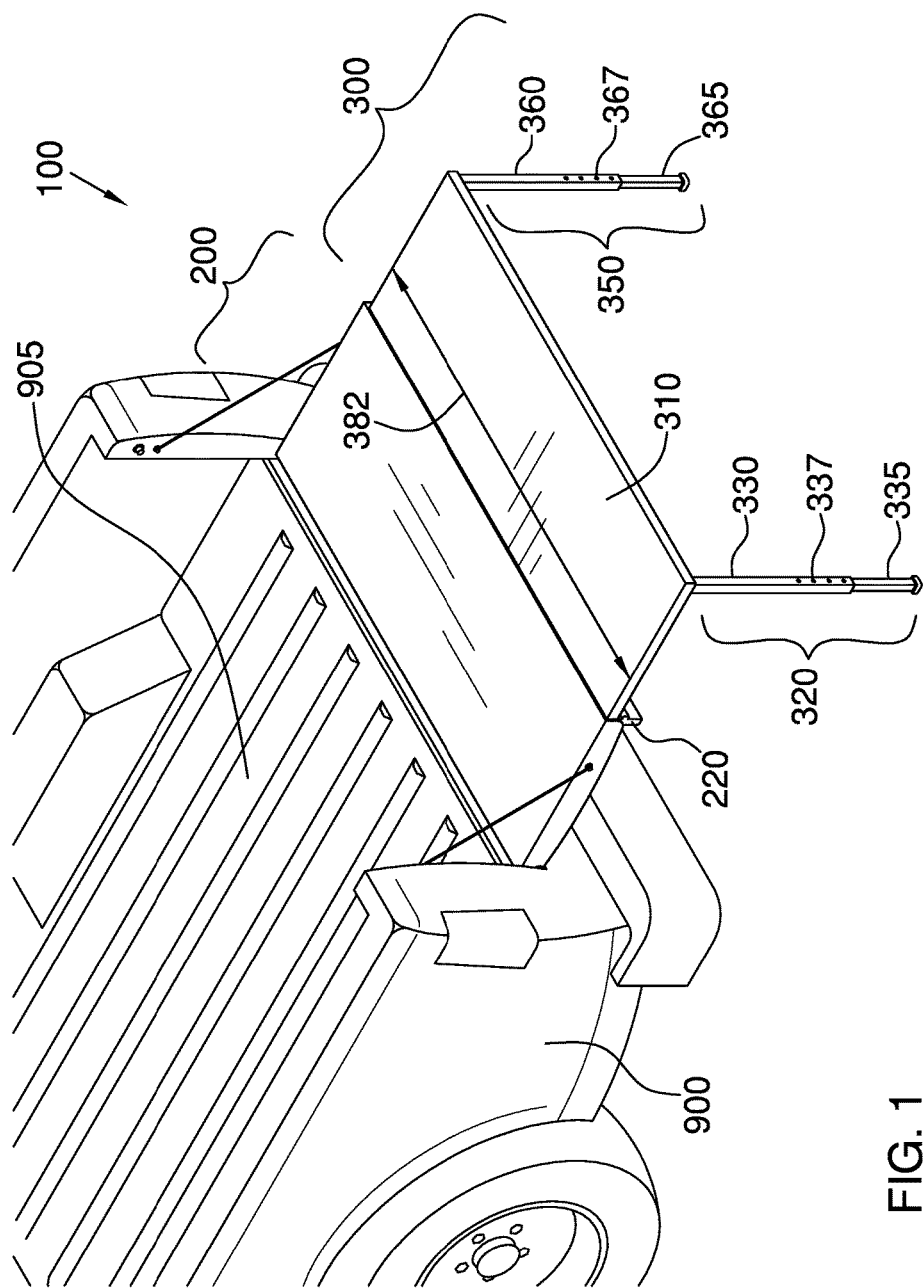
FIG. 1 is a perspective view of an embodiment of the disclosure.
Figure 2:
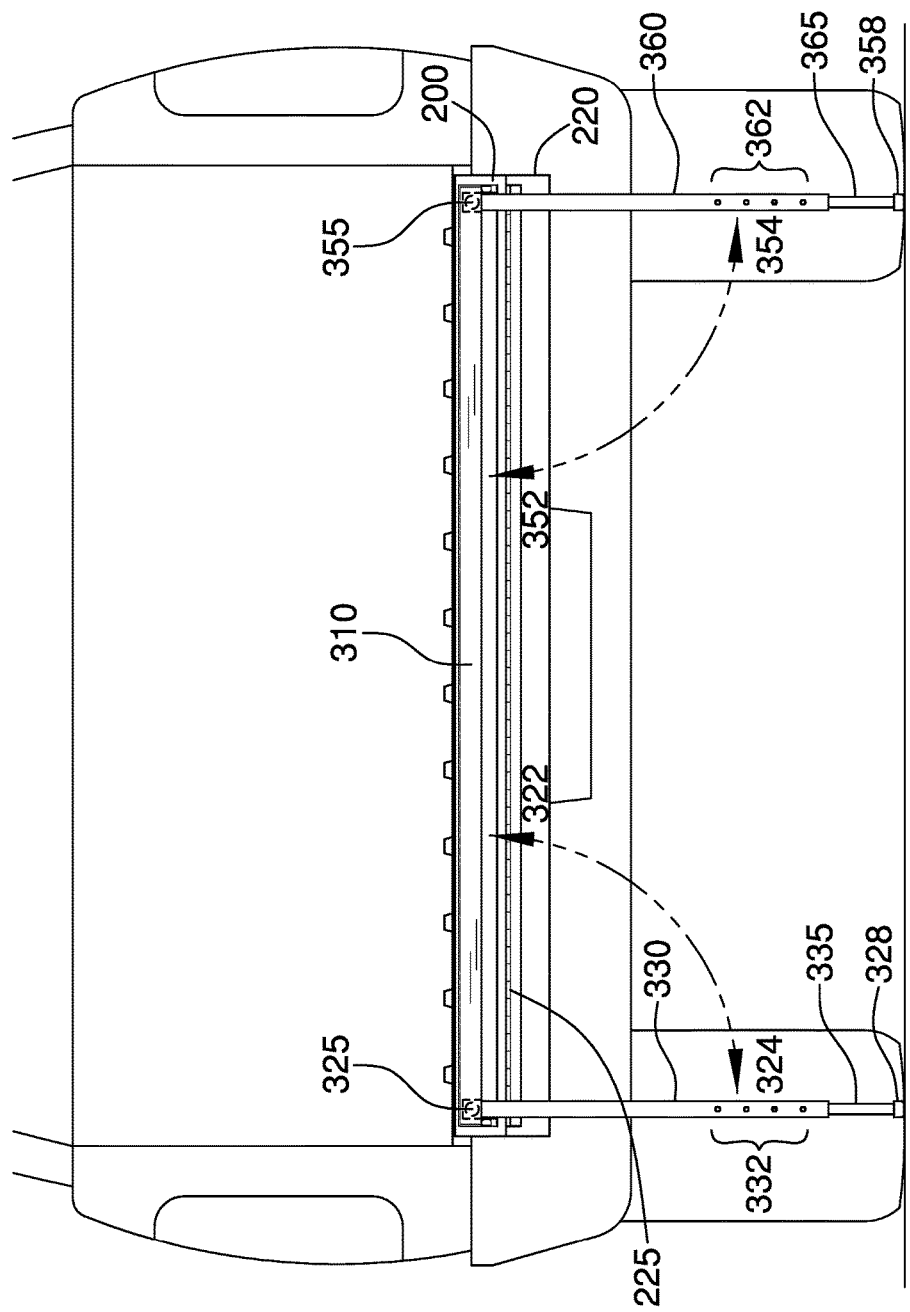
FIG. 2 is a rear view of an embodiment of the disclosure.
Figure 3:
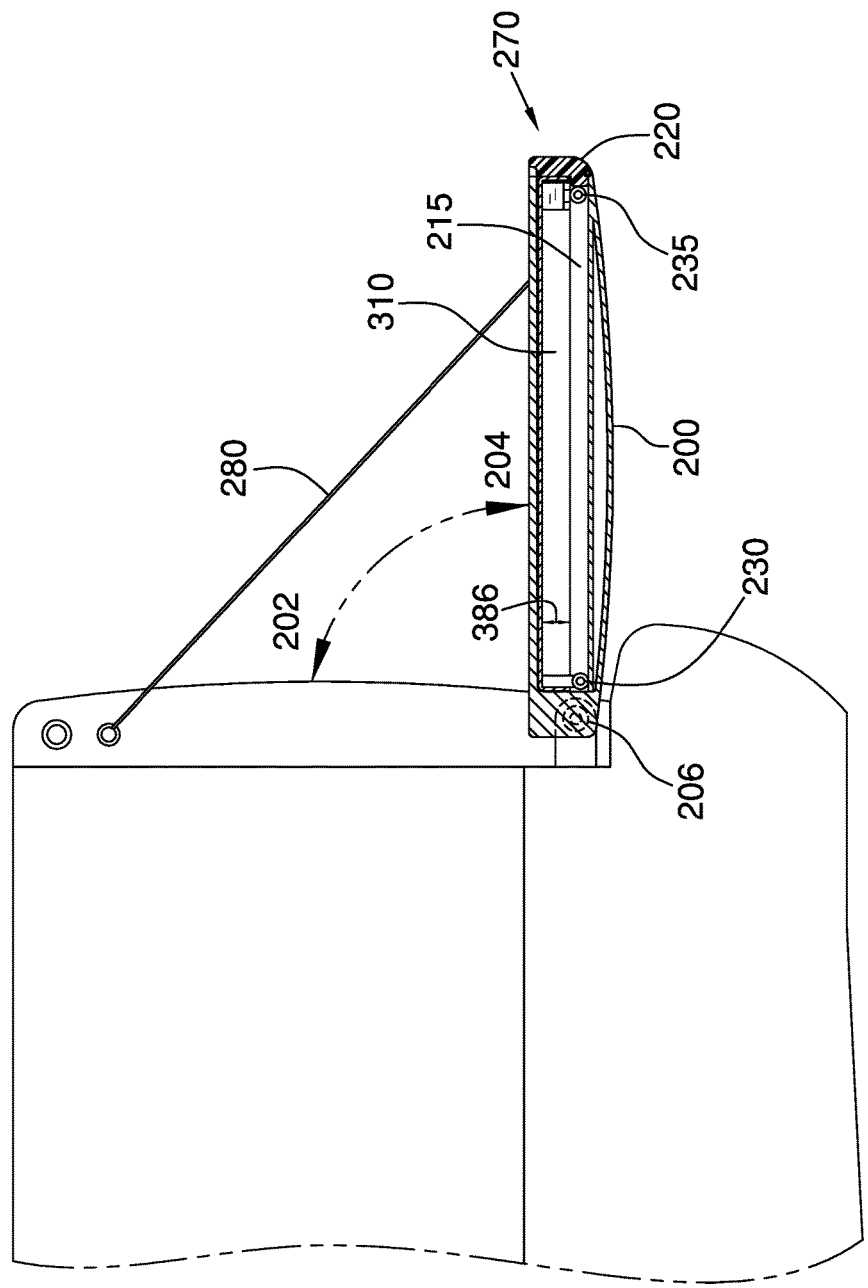
FIG. 3 is a side view of an embodiment of the disclosure with the extendable table stored inside of the tailgate.
Figure 4:
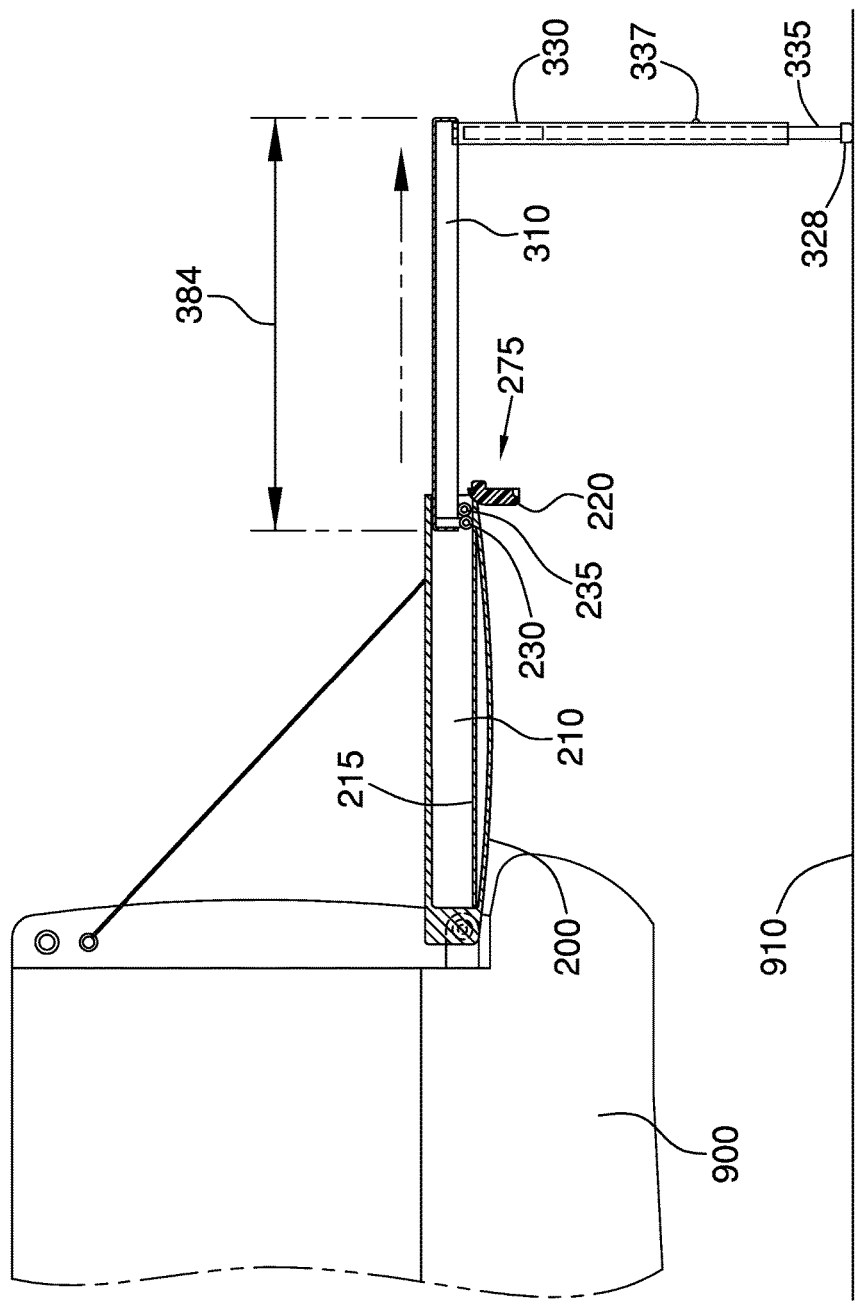
FIG. 4 is a side view of an embodiment of the disclosure with the extendable table deployed outside of the tailgate.

Detailed reference will now be made to a first potential embodiment of the disclosure, which is illustrated in FIGS. 1 through 4.

The truck tailgate table 100 (hereinafter invention) comprises a tailgate 200 and an extendable table 300. The extendable table 300 may be stored within the tailgate 200 and may be deployed when the tailgate 200 is in a lowered position 204. The extendable table 300 may provide horizontal workspace during camping trips, tailgating, and other outdoor events.

Throughout this disclosure, directional references are defined as follows: up and down are defined within a gravitational frame of reference with down being the direction that gravity would pull an object and up being the opposite of down. Front and rear are defined using a pickup truck 900 as a reference. Specifically, the front of the invention 100 is in the direction of the font of the pickup truck 900 and the rear of the invention 100 is in the direction of the rear of the pickup truck 900. Left and right are defined with reference to an observer standing behind the pickup truck 900 looking towards the pickup truck 900: the left side of the invention 100 corresponds to the left side of the observer and of the pickup truck 900 and the right side of the invention 100 corresponds to the right side of the observer and of the pickup truck 900. Unless noted otherwise, all directional references related to the tailgate 200 assume that the tailgate 200 is oriented horizontally—in the lowered position 204.

The tailgate 200 comprises a tailgate cap 220, a cap hinge 225, a left rear roller 235, and a right rear roller (not illustrated in the figures). The tailgate 200 may be the rear wall of a cargo area 905 of the pickup truck 900. The tailgate 200 may couple to the pickup truck 900 at a tailgate hinge 206 located at the front edge of the tailgate 200. The tailgate 200 may pivot at the tailgate hinge 206 between an upright position 202 and the lowered position 204. While in the lowered position 204, the tailgate 200 may be oriented horizontally.

The tailgate 200 may comprise a tailgate cavity 210. The tailgate cavity 210 may be a hollow area for storing the extendable table 300 within the walls of the tailgate 200. The tailgate cavity 210 may be open at the rear edge of the tailgate 200.

The tailgate cap 220 may pivotally couple to the tailgate 200 at the cap hinge 225. The cap hinge 225 may be located on the underside of the rear of the tailgate 200. When the tailgate cap 220 is in a cap closed position 270, the tailgate cap 220 may cover and enclose the tailgate cavity 210. The cap hinge 225 may allow the tailgate cap 220 to swing towards the rear and down into a cap opened position 275 under the tailgate 200 so that a table top 310 may be accessed when the tailgate 200 is in the lowered position 204.

The left rear roller 235 may be coupled to a bottom of the cavity 215 on the left side at the rear of the tailgate cavity 210. The left rear roller 235 may be oriented so that its axis of rotation is oriented from side-to-side. The right rear roller may be coupled to the bottom of the cavity 215 on the right side at the rear of the tailgate cavity 210. The right rear roller may be oriented so that its axis of rotation is oriented from side-to-side. The left rear roller 235 and the right rear roller may reduce friction as the extendable table 300 is withdrawn from the tailgate cavity 210 by rolling against the underside of the table top 310.

The tailgate 200 may comprise at least one support strap 280 to support the weight of the tailgate 200 and any load on the tailgate 200 when the tailgate 200 is in the lowered position 204.

The extendable table 300 comprises the table top 310, a left front roller 230, a right front roller (not illustrated in the figures), a left telescopic leg 320, and a right telescopic leg 350. The table top 310 may be a rectangular work surface. A tabletop width 382 may be less than a cavity width as measured from side-to-side. A tabletop length 384 may be less than a cavity length as measured from front-to-rear.

The left front roller 230 may be coupled to the underside of the table top 310 at the left front corner of the table top 310. The left front roller 230 may be oriented so that its axis of rotation is oriented from side-to-side. The right front roller may be coupled to the underside of the table top 310 at the right front corner of the table top 310. The right front roller may be oriented so that its axis of rotation is oriented from side-to-side. The left front roller 230 and the right front roller may reduce friction as the extendable table 300 is withdrawn from the tailgate cavity 210 by rolling over the bottom of the cavity 215.

The left front roller 230 and the right front roller may also serve as stops that prevent the table top 310 from being pulled out of the tailgate 200. Specifically, as the table top 310 is pulled out of the tailgate 200, the left front roller 230 moves towards the left rear roller 235 and the right front roller moves towards the right rear roller. When the left front roller 230 reaches the left rear roller 235 it cannot move any further. When the right front roller reaches the right rear roller it cannot move any further. The inability of the left front roller 230 and the right front roller to move any further prevents the table top 310 from being pulled out of the tailgate 200.

The tailgate cavity 210 may comprise a cavity height which is at least as high as a tabletop height 386 plus the height of either the left front roller 230 or the right front roller so that the table top 310 with the left front roller 230 and the right front roller may fit within the tailgate cavity 210.

The left telescopic leg 320 may be hingedly coupled to the underside of the table top 310 at the left rear corner of the table top 310 via a left leg hinge 325. The left telescopic leg 320 may rotate through an angle of 90 degrees. The plane of rotation of the left telescopic leg 320 may be oriented vertically and from side-to-side. The left telescopic leg 320 may be rotated up into a left leg up position 322 where the left telescopic leg 320 may be horizontally oriented under the rear edge of the table top 310, running from the left rear corner of the table top 310 towards the right side of the table top 310. The left telescopic leg 320 may be rotated down into a left leg down position 324 where the left telescopic leg 320 may be vertically oriented running straight down from the left rear corner of the table top 310 towards the ground 910.

The left telescopic leg 320 may comprise a left upper leg 330 and a left lower leg 335. An inside diameter of the left upper leg 330 may be at least as large as an outside diameter of the left lower leg 335 so that the left lower leg 335 may slide up and down within the left upper leg 330. The left telescopic leg 320 may comprise a plurality of left leg adjustment holes 332 and a left leg adjustment button 337 for adjusting the height of the left telescopic leg 320. The plurality of left leg adjustment holes 332 and the left leg adjustment button 337 may allow the left telescopic leg 320 to be extended or retracted and then locked into position such that the left telescopic leg 320 reaches from the table top 310 to the ground 910 when the table top 310 is oriented horizontally to the ground 910. Specifically, the left upper leg 330 may comprise the plurality of left leg adjustment holes 332 and the left lower leg 335 may comprise the left leg adjustment button 337. The left leg adjustment button 337 may be spring-loaded and may engage with one of the plurality of left leg adjustment holes 332 when the left leg adjustment button 337 and the one of the plurality of left leg adjustment holes 332 are in alignment. Engagement of the left leg adjustment button 337 may involve having the left leg adjustment button 337 pushed outward by a spring until the left leg adjustment button 337 pushes into one of the plurality of left leg adjustment holes 332. When the left leg adjustment button 337 is engaged in a hole, the left leg adjustment button 337 may prevent the left lower leg 335 and the left upper leg 330 from sliding relative to each other. The bottom of the left telescopic leg 320 may comprise a left leg cap 328.

The right telescopic leg 350 may be hingedly coupled to the underside of the table top 310 at the right rear corner of the table top 310 via a right leg hinge 355. The right telescopic leg 350 may rotate through an angle of 90 degrees. The plane of rotation of the right telescopic leg 350 may be oriented vertically and from side-to-side. The right telescopic leg 350 may be rotated up into a right leg up position 352 where the right telescopic leg 350 may be horizontally oriented under the rear edge of the table top 310, running from the right rear corner of the table top 310 towards the left side of the table top 310. The right telescopic leg 350 may be rotated down into a right leg down position 354 where the right telescopic leg 350 may be vertically oriented running straight down from the right rear corner of the table top 310 towards the ground 910.

The right telescopic leg 350 may comprise a right upper leg 360 and a right lower leg 365. An inside diameter of the right upper leg 360 may be at least as large as an outside diameter of the right lower leg 365 so that the right lower leg 365 may slide up and down within the right upper leg 360. The right telescopic leg 350 may comprise a plurality of right leg adjustment holes 362 and a right leg adjustment button 367 for adjusting the height of the right telescopic leg 350. The plurality of right leg adjustment holes 362 and the right leg adjustment button 367 may allow the right telescopic leg 350 to be extended or retracted and then locked into position such that the right telescopic leg 350 reaches from the table top 310 to the ground 910 when the table top 310 is oriented horizontally to the ground 910. Specifically, the right upper leg 360 may comprise the plurality of right leg adjustment holes 362 and the right lower leg 365 may comprise the right leg adjustment button 367. The right leg adjustment button 367 may be spring-loaded and may engage with one of the plurality of right leg adjustment holes 362 when the right leg adjustment button 367 and the one of the plurality of right leg adjustment holes 362 are in alignment. Engagement of the right leg adjustment button 367 may involve having the right leg adjustment button 367 pushed outward by a spring until the right leg adjustment button 367 pushes into one of the plurality of right leg adjustment holes 362. When the right leg adjustment button 367 is engaged in a hole, the right leg adjustment button 367 may prevent the right lower leg 365 and the right upper leg 360 from sliding relative to each other. The bottom of the right telescopic leg 350 may comprise a right leg cap 358.

The height of the left telescopic leg 320 and the height of the right telescopic leg 350 may be adjusted independently of each other to compensate for circumstances where the ground 910 is uneven.

In use, the pickup truck 900 may be parked at a campsite, in a parking lot, or at some other outdoor venue and the tailgate 200 may be moved to the lowered position 204. The tailgate cap 220 may be move to the cap opened position 275 by rotating the tailgate cap 220 rearward and downward around the cap hinge 225. The table top 310 may be pulled horizontally out of the tailgate 200 until the left front roller 230 and the right front roller stop rearward motion of the table top 310. The left telescopic leg 320 and the right telescopic leg 350 may be pivoted downwards until they are oriented vertically. The left leg adjustment button 337 may be depressed to disengage the left leg adjustment button 337 from the plurality of left leg adjustment holes 332 and the left lower leg 335 may be adjusted up or down to match height of the ground 910. The left leg adjustment button 337 may engage one or the plurality of left leg adjustment holes 332 to hold the left lower leg 335 at that height. The right leg adjustment button 367 may be depressed to disengage the right leg adjustment button 367 from the plurality of right leg adjustment holes 362 and the right lower leg 365 may be adjusted up or down to match height of the ground 910. The right leg adjustment button 367 may engage one or the plurality of right leg adjustment holes 362 to hold the right lower leg 365 at that height. The extendable table 300 may be used for event related activities. Non-limiting examples of event related activities may include food preparation, food service, dining, and/or game playing. When the extendable table 300 is no longer needed, the above steps may be reversed to shorten the left telescopic leg 320 and the right telescopic leg 350, to pivot the left telescopic leg 320 and the right telescopic leg 350 into position beneath the table top 310, to push the table top 310 into the tailgate 200, and to close the tailgate cap 220.

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, a "cavity" is an empty space or negative space that is formed within an object.

As used herein, the words "couple", "couples", "coupled" or "coupling", refer to connecting, either directly or indirectly, and does not necessarily imply a mechanical connection.

As used in this disclosure, a "diameter" of an object is a straight line segment that passes through the center (or center axis) of an object. The line segment of the diameter is terminated at the perimeter or boundary of the object through which the line segment of the diameter runs.

As used herein, "front" indicates the side of an object that is closest to a forward direction of travel under normal use of the object or the side or part of an object that normally presents itself to view or that is normally used first. "Rear" or "back' refers to the side that is opposite the front.

As used in this disclosure, a "hinge" is a device that permits the turning, rotating, or pivoting of a first object relative to a second object.

As used in this disclosure, "horizontal" is a directional term that refers to a direction that is perpendicular to the local force of gravity. Unless specifically noted in this disclosure, the horizontal direction is always perpendicular to the vertical direction.

As used herein, "inside diameter" refers to a measurement made on a hollow conduit. Specifically, the inside diameter is the distance from one inside wall to the opposite inside wall. If the conduit is round, then the inside diameter is a true diameter, however the term may also be used in connection with a square conduit in which case the inside diameter is simply the narrowest inside measurement that passes through the center of the conduit.

As used in this disclosure, the term "load" refers to an object that upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

As used herein, "outside diameter" refers to a measurement made on an object. Specifically, the outside diameter is the distance from one point on the outside of the object to a point on the opposite side of the object along a line passing through the center of the object. The term outside diameter is frequently used in conjunction with round objects such as hollow conduits in which case the outside diameter is a true diameter, however the term may also be used in connection with a square object in which case the outside diameter is simply the narrowest outside measurement that passes through the center of the conduit.

As used in this disclosure, a "pickup truck" is a vehicle having an enclosed cab and an open body comprising low sides and a tailgate. The vehicle is typically powered by an internal combustion engine.

As used herein, the word "pivot" is intended to include any mechanical arrangement that allows for rotational motion. Non-limiting examples of pivots may include hinges, holes, posts, dowels, pins, points, rods, shafts, balls, and sockets, either individually or in combination.

As used in this disclosure, a "spring" is a device that is used to store mechanical energy. This mechanical energy will often be stored by deforming an elastomeric material that is used to make the device, by the application of a torque to a rigid structure, or by a combination thereof. In some embodiments, the rigid structure to which torque is applied may be composed of metal or plastic.

As used in this disclosure a "strap" is a strip of leather, cloth, plastic, thin metal, or other flexible material, often with a buckle, that is used to fasten, secure, carry, or hold onto something.

As used in this disclosure, a "tailgate" is a hinged door mounted on the rear of a pickup truck that can be lowered and, in some embodiments, removed in order to facilitate loading of the pickup truck.

As used in this disclosure, "telescopic" is an adjective that describes an object made of sections that fit or slide into each other such that the object can be made longer or shorter by adjusting the relative positions of the sections.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A truck tailgate table comprising:
a tailgate and an extendable table;
wherein the extendable table is stored within the tailgate;
wherein the extendable table is deployed when the tailgate is in a lowered position;
wherein the extendable table provides horizontal workspace during outdoor events;
wherein the tailgate comprises a tailgate cap, a cap hinge, a left rear roller, and a right rear roller;
wherein the tailgate is the rear wall of a cargo area of a pickup truck;
wherein the tailgate couples to the pickup truck at a tailgate hinge located at the front edge of the tailgate;
wherein the tailgate pivots at the tailgate hinge between an upright position and the lowered position;
wherein the tailgate is oriented horizontally while in the lowered position;
wherein the tailgate comprises a tailgate cavity;
wherein the tailgate cavity is a hollow area for storing the extendable table within the walls of the tailgate;
wherein the tailgate cavity is open at the rear edge of the tailgate;
wherein the tailgate cap pivotally couples to the tailgate at the cap hinge;
wherein the cap hinge is located on the underside of the rear of the tailgate;
wherein when the tailgate cap is in a cap closed position, the tailgate cap covers the tailgate cavity;
wherein the cap hinge allows the tailgate cap to swing into a cap opened position under the tailgate so that a table top is accessed when the tailgate is in the lowered position;
wherein the left rear roller is coupled to a bottom of the cavity on the left side at the rear of the tailgate cavity;
wherein the left rear roller is oriented so that its axis of rotation is oriented from side-to-side.

2. The truck tailgate table according to claim 1
wherein the right rear roller is coupled to the bottom of the cavity on the right side at the rear of the tailgate cavity;
wherein the right rear roller is oriented so that its axis of rotation is oriented from side-to-side.

3. The truck tailgate table according to claim 2
wherein the left rear roller and the right rear roller reduce friction as the extendable table is withdrawn from the tailgate cavity by rolling against the underside of the table top.

4. The truck tailgate table according to claim 3
wherein the extendable table comprises the table top, a left front roller, a right front roller, a left telescopic leg, and a right telescopic leg;
wherein the table top is a rectangular work surface.

5. The truck tailgate table according to claim 4
wherein a tabletop width is less than a cavity width as measured from side-to-side;
wherein a tabletop length is less than a cavity length as measured from front-to-rear.

6. The truck tailgate table according to claim 5
wherein the left front roller is coupled to the underside of the table top at the left front corner of the table top;
wherein the left front roller is oriented so that its axis of rotation is oriented from side-to-side.

7. The truck tailgate table according to claim 6
wherein the right front roller is coupled to the underside of the table top at the right front corner of the table top;
wherein the right front roller is oriented so that its axis of rotation is oriented from side-to-side.

8. The truck tailgate table according to claim 7
wherein the left front roller and the right front roller reduce friction as the extendable table is withdrawn from the tailgate cavity by rolling over the bottom of the cavity.

9. The truck tailgate table according to claim 8
wherein the left front roller and the right front roller serve as stops that prevent the table top from being pulled out of the tailgate;
wherein as the table top is pulled out of the tailgate, the left front roller moves towards the left rear roller and the right front roller moves towards the right rear roller;
wherein when the left front roller reaches the left rear roller it cannot move any further;
wherein when the right front roller reaches the right rear roller it cannot move any further;
wherein the inability of the left front roller and the right front roller to move any further prevents the table top from being pulled out of the tailgate.

10. The truck tailgate table according to claim 9
wherein the tailgate cavity comprises a cavity height which is at least as high as a tabletop height plus the height of either the left front roller or the right front roller so that the table top with the left front roller and the right front roller fit within the tailgate cavity.

11. The truck tailgate table according to claim 10
wherein the left telescopic leg is hingedly coupled to the underside of the table top at the left rear corner of the table top via a left leg hinge;
wherein the left telescopic leg rotates through an angle of 90 degrees;
wherein the plane of rotation of the left telescopic leg is oriented vertically and from side-to-side;
wherein the left telescopic leg rotates up into a left leg up position where the left telescopic leg is horizontally oriented under the rear edge of the table top, running from the left rear corner of the table top towards the right side of the table top;
wherein the left telescopic leg rotates down into a left leg down position where the left telescopic leg is vertically oriented running straight down from the left rear corner of the table top towards the ground.

12. The truck tailgate table according to claim 11
wherein the left telescopic leg comprises a left upper leg and a left lower leg;
wherein an inside diameter of the left upper leg is at least as large as an outside diameter of the left lower leg so that the left lower leg slides up and down within the left upper leg;
wherein the left telescopic leg comprises a plurality of left leg adjustment holes and a left leg adjustment button for adjusting the height of the left telescopic leg;
wherein the plurality of left leg adjustment holes and the left leg adjustment button allow the left telescopic leg to be extended or retracted and then locked into position such that the left telescopic leg reaches from the table top to the ground when the table top is oriented horizontally to the ground;
wherein the left upper leg comprises the plurality of left leg adjustment holes and the left lower leg comprises the left leg adjustment button;
wherein the left leg adjustment button is spring-loaded and engages with one of the plurality of left leg adjustment holes when the left leg adjustment button and the one of the plurality of left leg adjustment holes are in alignment.

13. The truck tailgate table according to claim 12
wherein the right telescopic leg is hingedly coupled to the underside of the table top at the right rear corner of the table top via a right leg hinge;
wherein the right telescopic leg rotates through an angle of 90 degrees;
wherein the plane of rotation of the right telescopic leg is oriented vertically and from side-to-side;
wherein the right telescopic leg rotates up into a right leg up position where the right telescopic leg is horizontally oriented under the rear edge of the table top, running from the right rear corner of the table top towards the left side of the table top;
wherein the right telescopic leg rotates down into a right leg down position where the right telescopic leg is vertically oriented running straight down from the right rear corner of the table top towards the ground.

14. The truck tailgate table according to claim 13
wherein the right telescopic leg comprises a right upper leg and a right lower leg;
wherein an inside diameter of the right upper leg is at least as large as an outside diameter of the right lower leg so that the right lower leg slides up and down within the right upper leg;
wherein the right telescopic leg comprises a plurality of right leg adjustment holes and a right leg adjustment button for adjusting the height of the right telescopic leg;
wherein the plurality of right leg adjustment holes and the right leg adjustment button allow the right telescopic leg to be extended or retracted and then locked into position such that the right telescopic leg reaches from the table top to the ground when the table top is oriented horizontally to the ground;
wherein the right upper leg comprises the plurality of right leg adjustment holes and the right lower leg comprises the right leg adjustment button;
wherein the right leg adjustment button is spring-loaded and engages with one of the plurality of right leg adjustment holes when the right leg adjustment button and the one of the plurality of right leg adjustment holes are in alignment.

15. The truck tailgate table according to claim 14 wherein the height of the left telescopic leg and the height of the right telescopic leg are adjusted independently of each other to compensate for circumstances where the ground is uneven.

* * * * *